United States Patent
Chang et al.

(10) Patent No.: US 9,645,431 B2
(45) Date of Patent: May 9, 2017

(54) TOUCH DISPLAY AND METHOD FOR DRIVING A PLURALITY OF TOUCH DRIVING ELECTRODES OF TOUCH DISPLAY

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 322 days.

(21) Appl. No.: 14/081,018

(22) Filed: Nov. 15, 2013

(65) Prior Publication Data

US 2014/0071360 A1    Mar. 13, 2014

Related U.S. Application Data

(63) Continuation-in-part of application No. 13/211,684, filed on Aug. 17, 2011, now Pat. No. 8,614,684, and (Continued)

(51) Int. Cl.
G06F 3/041    (2006.01)
G06F 3/044    (2006.01)
(Continued)

(52) U.S. Cl.
CPC .......... *G02F 1/13338* (2013.01); *G06F 3/044* (2013.01); *G06F 3/0412* (2013.01);
(Continued)

(58) Field of Classification Search
CPC ...... G06F 3/044; G06F 3/0412; G06F 3/0416; G06F 3/041; G02F 1/13338;
(Continued)

(56) References Cited

U.S. PATENT DOCUMENTS 7,548,073 B2    6/2009   Mackey et al.
7,692,431 B2    4/2010   Mackey
(Continued)

FOREIGN PATENT DOCUMENTS

CN    101393502    3/2009
CN    101571780    11/2015
(Continued)

*Primary Examiner* — Lin Li
(74) *Attorney, Agent, or Firm* — WPAT, PC; Justin King

(57) ABSTRACT

A touch display provided by the present invention includes a control unit and a display. The control unit outputs driving signals to a plurality of touch driving electrodes and receives sensing signals from a plurality of touch sensing electrodes so as to detect touch or proximity of at least one external object based on the capacitive coupling between the driving and sensing electrodes. The display includes a liquid crystal layer, a pixel electrode and a common electrode, wherein the liquid crystal layer is driven by the pixel electrode and the common electrode. The common electrode includes the touch driving electrodes, and the common electrode except the touch driving electrodes are electrically coupled to a DC potential to form a shielded region.

20 Claims, 13 Drawing Sheets

Related U.S. Application Data a continuation-in-part of application No. 13/650,649, filed on Oct. 12, 2012, now Pat. No. 8,952,928, and a continuation-in-part of application No. 12/407,100, filed on Mar. 19, 2009, now Pat. No. 8,546,705.

(60) Provisional application No. 61/577,181, filed on Dec. 19, 2011, provisional application No. 61/547,186, filed on Oct. 14, 2011, provisional application No. 61/472,971, filed on Apr. 7, 2011, provisional application No. 61/435,568, filed on Jan. 24, 2011, provisional application No. 61/428,499, filed on Dec. 30, 2010.

(51) Int. Cl.
*G06F 1/16* (2006.01)
*G02F 1/1333* (2006.01)

(52) U.S. Cl.
CPC .. *G06F 3/0416* (2013.01); *G06F 2203/04104* (2013.01); *G06F 2203/04107* (2013.01)

(58) Field of Classification Search
CPC .............. G02F 1/134309; G02F 1/167; G02F 2001/1676; G09G 2300/0434; G09G 3/3655; G09G 3/3677
See application file for complete search history.

(56) References Cited

U.S. PATENT DOCUMENTS

| | | |
|---|---|---|
| 8,269,743 B2 | 9/2012 | Kuo et al. |
| 8,749,518 B2 | 6/2014 | Kuo |
| 8,766,946 B2 | 7/2014 | Kanda et al. |
| 9,030,420 B2 | 5/2015 | Noguchi et al. |
| 9,046,968 B2 | 6/2015 | Noguchi et al. |
| 2004/0223089 A1* | 11/2004 | Hong et al. ............... 349/12 |
| 2006/0033011 A1 | 2/2006 | Choi et al. |
| 2007/0240914 A1 | 10/2007 | Lai et al. |
| 2008/0048997 A1 | 2/2008 | Gillespie et al. |
| 2008/0062139 A1 | 3/2008 | Hotelling et al. |
| 2008/0062148 A1 | 3/2008 | Hotelling et al. |
| 2008/0069413 A1 | 3/2008 | Riedijk et al. |
| 2008/0259053 A1 | 10/2008 | Newton et al. |
| 2008/0277171 A1 | 11/2008 | Wright |
| 2008/0309633 A1 | 12/2008 | Hotelling et al. |
| 2009/0002336 A1 | 1/2009 | Choi et al. |
| 2009/0063715 A1 | 3/2009 | de Cesare et al. |
| 2009/0109190 A1 | 4/2009 | Elias |
| 2009/0159344 A1 | 6/2009 | Hotelling et al. |
| 2009/0213090 A1 | 8/2009 | Mamba et al. |
| 2010/0110038 A1 | 5/2010 | Mo et al. |
| 2010/0289759 A1 | 11/2010 | Fisher et al. |
| 2011/0032193 A1 | 2/2011 | Szalkowski et al. |
| 2011/0050617 A1 | 3/2011 | Murphy et al. |
| 2011/0117971 A1* | 5/2011 | Kim ................. G06F 1/1647 455/566 |
| 2011/0267295 A1* | 11/2011 | Noguchi ............ G06F 3/0416 345/173 |
| 2012/0068961 A1* | 3/2012 | Mizuhashi .......... G06F 3/0412 345/174 |
| 2012/0075201 A1* | 3/2012 | Golovchenko ....... G06F 1/1643 345/173 |
| 2012/0105752 A1* | 5/2012 | Park .................. G02F 1/13338 349/33 |
| 2013/0038574 A1 | 2/2013 | Chang et al. |
| 2013/0113780 A1* | 5/2013 | Miyatake .............. G06F 3/0412 345/212 |
| 2013/0207914 A1* | 8/2013 | Nagata ................... G06F 3/044 345/173 |
| 2013/0234987 A1 | 9/2013 | Ye et al. |
| 2013/0335374 A1* | 12/2013 | Sugita et al. ................. 345/174 |
| 2014/0022210 A1* | 1/2014 | Wu ................... G02F 1/13338 345/174 |
| 2014/0043288 A1* | 2/2014 | Kurasawa ............. G06F 3/0416 345/174 |
| 2014/0049705 A1* | 2/2014 | Sugita .................. G06F 3/0416 349/12 |
| 2014/0062899 A1* | 3/2014 | Lee ...................... G06F 3/0416 345/173 |
| 2014/0063385 A1* | 3/2014 | Yang ...................... G06F 3/044 349/15 |
| 2015/0022484 A1* | 1/2015 | Chiu .................... G06F 3/0412 345/174 |
| 2015/0062054 A1* | 3/2015 | Yun ..................... G06F 3/0412 345/174 |

FOREIGN PATENT DOCUMENTS

| | | | | |
|---|---|---|---|---|
| JP | WO 2012/117928 | * | 9/2012 | ............. G06F 3/044 |
| JP | WO 2012/0147634 | * | 11/2012 | ............. G06F 3/044 |
| JP | WO 2012/147634 | * | 11/2012 | ............. G06F 3/044 |
| TW | 201102895 | | 7/2009 | |
| TW | 201015409 | | 4/2010 | |
| TW | 201033875 | | 9/2010 | |
| TW | 201104545 | | 2/2011 | |
| TW | 201120717 | | 6/2011 | |
| TW | 201211867 | | 3/2012 | |
| TW | 201214258 | | 4/2012 | |
| TW | 201319907 | | 5/2013 | |

* cited by examiner

TOUCH DISPLAY AND METHOD FOR DRIVING A PLURALITY OF TOUCH DRIVING ELECTRODES OF TOUCH DISPLAY

CROSS REFERENCE TO RELATED APPLICATIONS

This application is a continuation-in-part of U.S. Non-Provisional application Ser. No. 13/211,684, filed Aug. 17, 2011, which claims the benefit of U.S. Provisional Application No. 61/472,971, filed on Apr. 7, 2011, Provisional Application No. 61/435,568, filed on Jan. 24, 2011 and U.S. Provisional Application No. 61/428,499, filed on Dec. 30, 2010, and this application is also a continuation-in-part of U.S. Non-Provisional application Ser. No. 13/650,649, filed Oct. 12, 2012, which claims the benefit of U.S. Provisional Application No. 61/547,186 filed on Oct. 14, 2011 and U.S. Provisional Application No. 61/577,181 filed on Dec. 19, 2011, which is herein incorporated by reference for all intents and purposes.

BACKGROUND OF THE INVENTION

1. Field of the Invention

The present invention relates to touch device and, more particularly, to touch display formed by integrating touch device components into display and method for driving a plurality of touch driving electrodes of touch display.

2. Description of the Prior Art

Many touch screens may be formed from a capacitive touch sensor panel that is overlaid across an LCD (Liquid Crystal Display). The touch screens provide driving signals to a plurality of touch driving electrodes and receive sensing signals from a plurality of touch sensing electrodes. When at least one external object (such as a user's finger) touches or approaches the intersection of a touch driving electrode and a touch sensing electrode, a capacitance between the touch driving electrode and the touch sensing electrode may change. This change in capacitance may indicate that a touch is occurring at this location.

While overlaying a substantially transparent capacitive touch sensor panel over an LCD may allow light from the LCD to pass through, the capacitive touch sensor panel may cause a non-zero reduction in the brightness of the LCD. Moreover, overlaying an LCD with a capacitive touch sensor panel may add thickness and weight. Although these faults stated above can be avoided by integrating touch screen components into display pixel cells of an LCD, EMI (ElectroMagnetic Interference) caused by the LCD which is updating frames will influence mutual capacitive coupling between the touch driving electrodes and the touch sensing electrodes.

SUMMARY OF THE INVENTION

In accordance with an embodiment of the present invention, the present invention provides a display, comprising: a pixel electrode; a common electrode, comprising a plurality of touch driving electrodes of a touch device, wherein the common electrode except the plurality of touch driving electrodes is coupled with a DC potential to form a shielding region; and a liquid crystal layer, placed between the pixel electrode and the common electrode and driven by the pixel electrode and the common electrode.

In accordance with another embodiment of the present invention, the present invention provides a touch device, comprising: a plurality of touch driving electrodes, integrated into a common electrode of a liquid crystal layer, wherein the common electrode except the plurality of touch driving electrodes is coupled with a DC potential to form a shielding region; a plurality of touch sensing electrodes; and a control unit, detecting capacitive coupling between the plurality of touch driving electrodes and the plurality of touch sensing electrodes so as to execute operations of at least one external object.

In accordance with an embodiment of the present invention, the present invention provides a touch display, comprising: a control unit, providing driving signals to a plurality of touch driving electrodes and receiving sensing signals from a plurality of touch sensing electrodes so as to detect touch or proximity of at least one external object based on capacitive coupling between the plurality of touch driving electrodes and the plurality of touch sensing electrodes; and a display, comprising a liquid crystal layer; and a pixel electrode and a common electrode which both drive the liquid crystal layer, wherein the common electrode comprises the plurality of touch driving electrodes, and the common electrode except the plurality of touch driving electrodes is coupled with a DC potential to form a shielding region.

In accordance with another embodiment of the present invention, the present invention provides a common electrode, integrated into a display, and the common electrode and a pixel electrode both drive a liquid crystal layer, wherein the common electrode comprises: a plurality of touch driving electrodes, wherein the common electrode except the plurality of touch driving electrodes is coupled with a DC potential to form a shielding region; wherein the plurality of touch driving electrodes are provided with driving signals, and sensing signals are received from the plurality of the touch sensing electrodes such that touch or proximity of at least one external object is detected based on the capacitive coupling between the plurality of touch driving electrodes and the plurality of touch sensing electrodes.

In accordance with an embodiment of the present invention, the present invention provides a method for driving a plurality of touch driving electrodes of a touch display, comprising: simultaneously providing driving signals to at least one touch driving electrode to detect mutual capacitances while the display updates one or more horizontal pixel lines.

DETAILED DESCRIPTION OF THE PREFERRED EMBODIMENTS

Figure 1A:
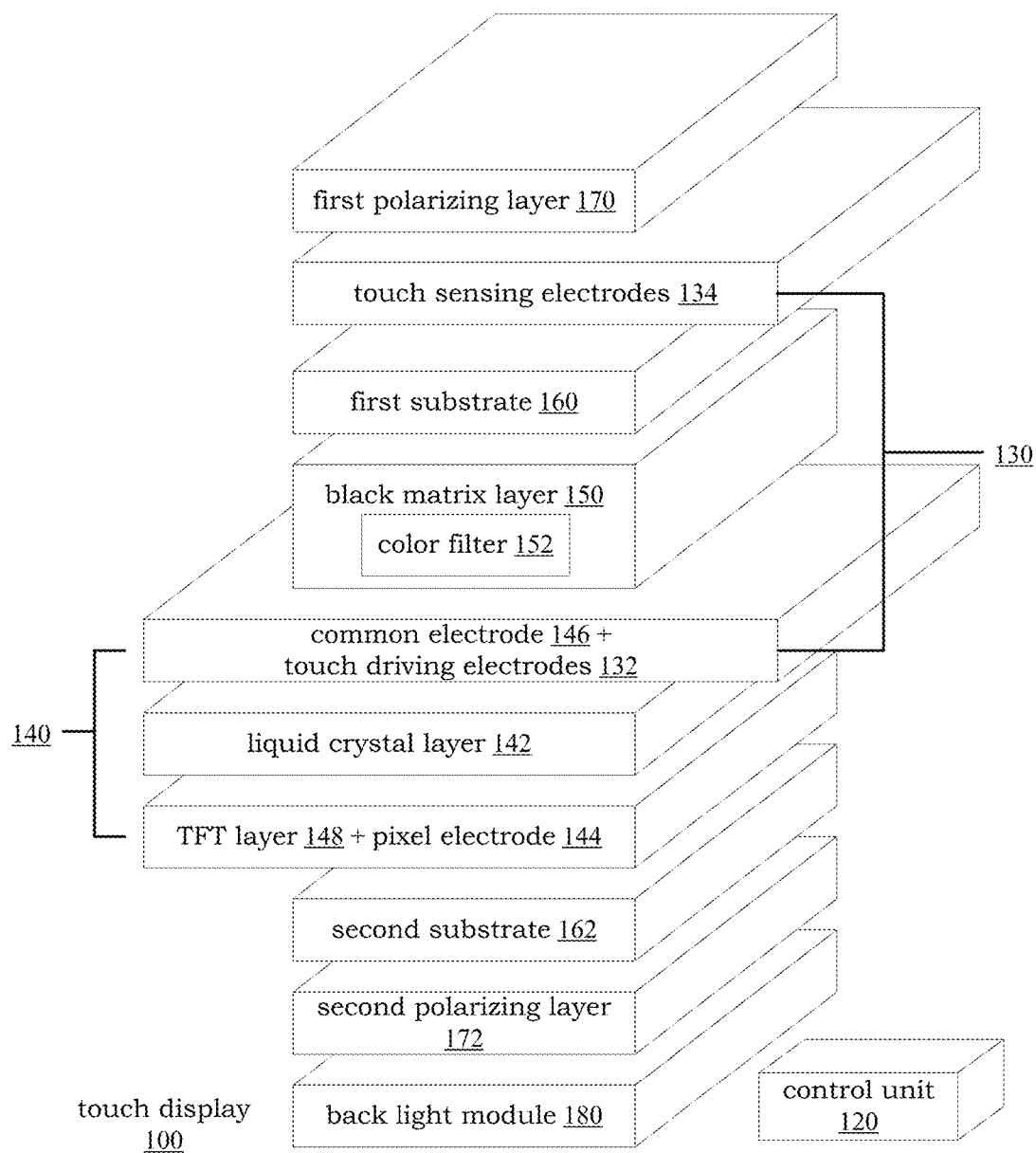
FIGS. 1A, 1B, 1C, 1D, 1E and 1F are schematic diagrams of a touch display 100 according to embodiments of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Please refer to FIG. 1A to FIG. 1F, which depict schematic diagrams of a touch display 100 according to embodiments of the present invention. The touch display 100 comprises a control unit 120, a touch sensing module 130 and a display pixel module 140.

The touch sensing module 130 comprises a plurality of touch driving electrodes 132 and a plurality of touch sensing electrodes 134. The control unit 120 outputs driving signals to the plurality of touch driving electrodes 132, and receives sensing signals from the plurality of touch sensing electrodes 134 so as to detect touch or proximity of at least one external object based on mutual capacitive coupling between the plurality of touch driving electrodes 132 and the plurality of touch sensing electrodes 134.

The display pixel module 140 comprises a liquid crystal layer 142, a pixel electrode 144 and a common electrode 146. The liquid crystal layer 142 is placed between the pixel electrode 144 and the common electrode 146, and is driven by the pixel electrode 144 and the common electrode 146. The plurality of touch driving electrodes 132 are integrated into the common electrode 146. The common electrode 146 except the plurality of touch driving electrodes 132 is coupled with a DC potential to form a shielding region.

The touch display 100 further comprises a TFT (thin film transistor) layer 148, wherein the pixel electrode 144 is integrated into the TFT layer 148. When the TFT layer 148 is updating, EMI (ElectroMagnetic Interference) caused by the TFT layer 148 will influence the plurality of touch sensing electrodes 134 to interfere with the mutual capacitive detection. Thus, the common electrode 146 is configured between the TFT layer 148 and the plurality of touch sensing electrodes 134 so as to reduce EMI by the shielding region while the TFT layer 148 is updating.

The touch display 100 further comprises a black matrix layer 150, a first substrate 160 and a first polarizing layer 170. The common electrode 146 is placed between the liquid crystal layer 142 and the black matrix layer 150. The black matrix layer 150 is placed between the common electrode 146 and the first substrate 160. The first substrate 160 is placed between the black matrix layer 150 and the first polarizing layer 170. In addition, the black matrix layer 150 comprises a color filter 152.

Figure 1B:
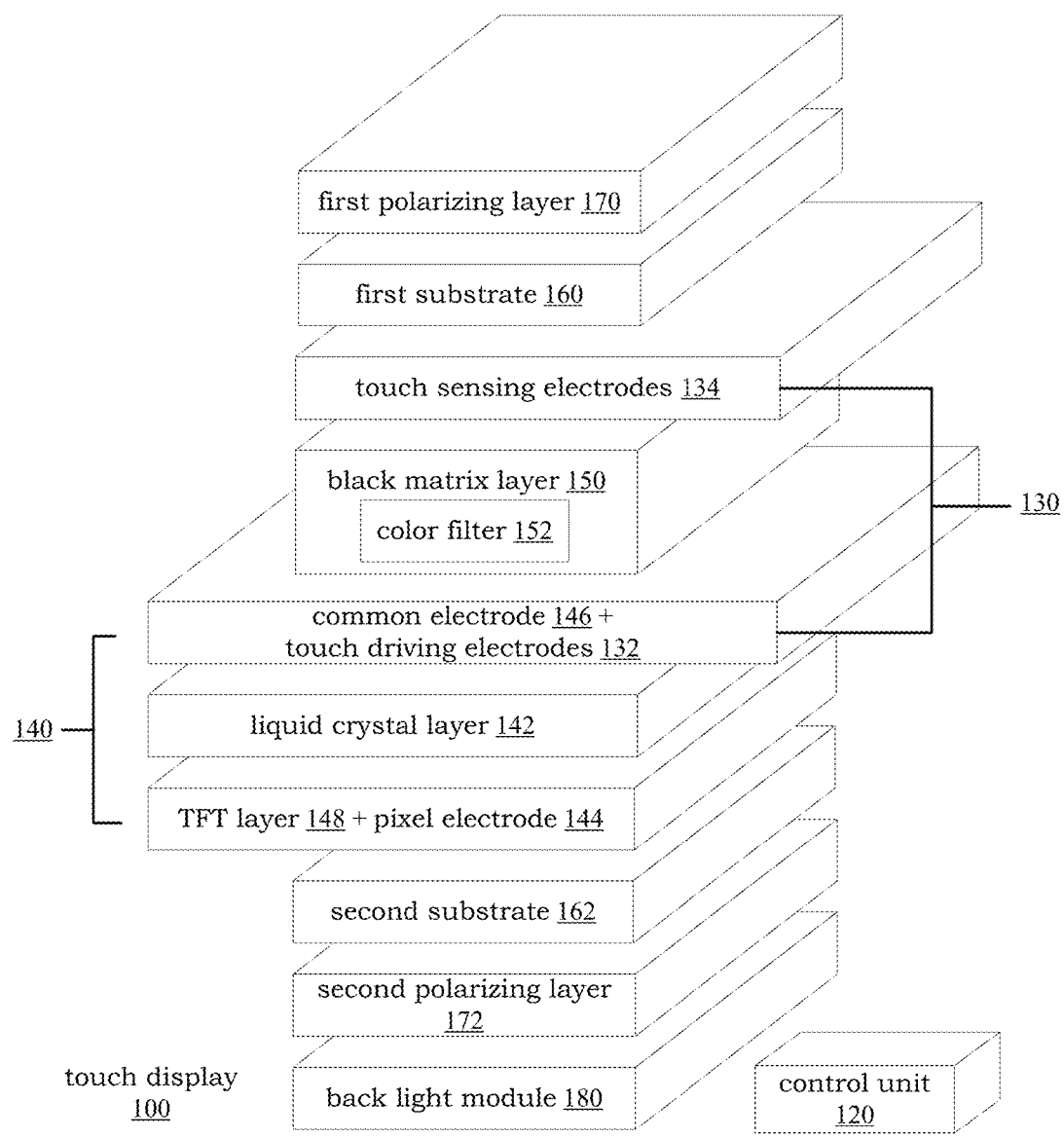
Figure 1C:
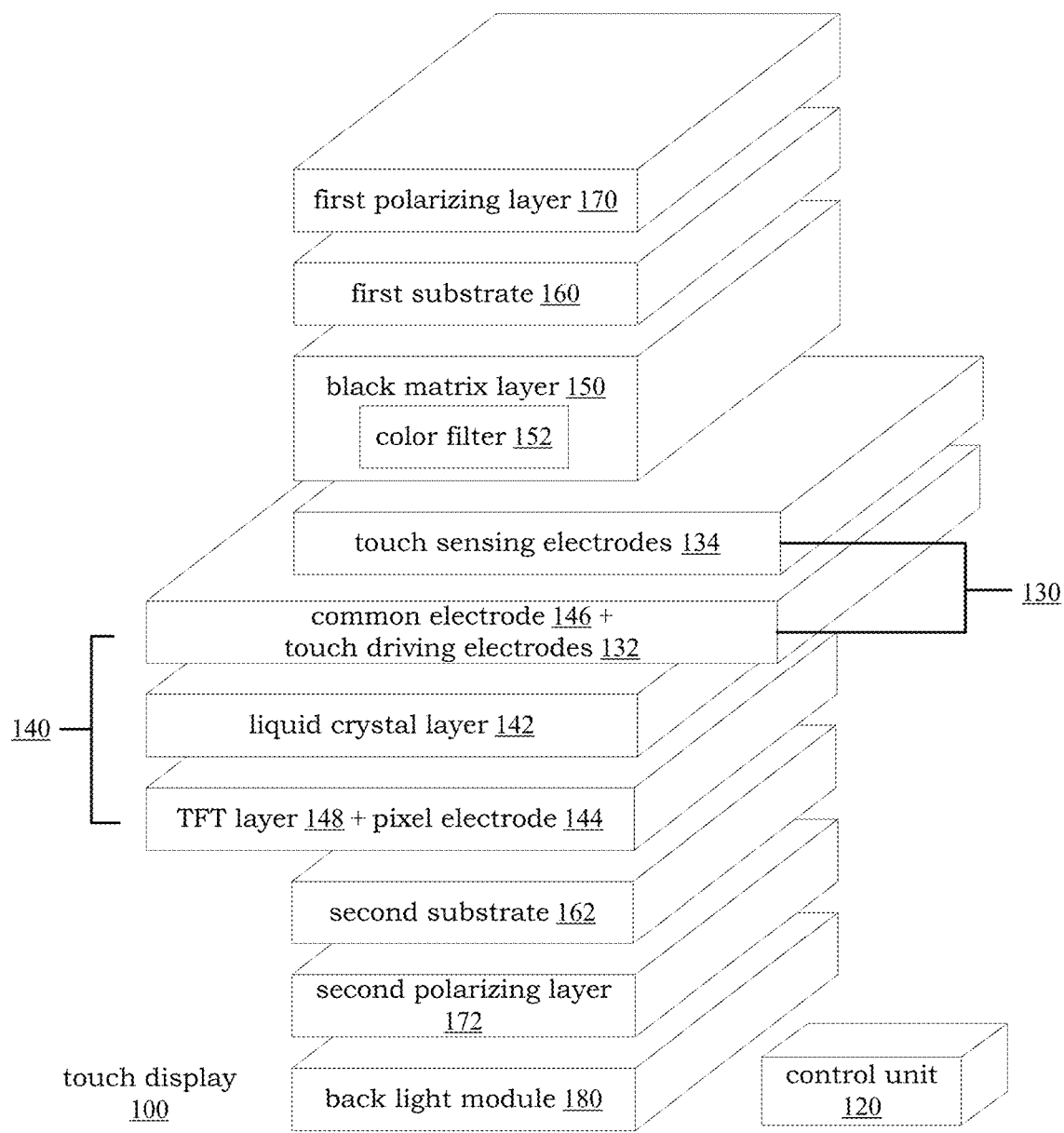
Figure 1D:
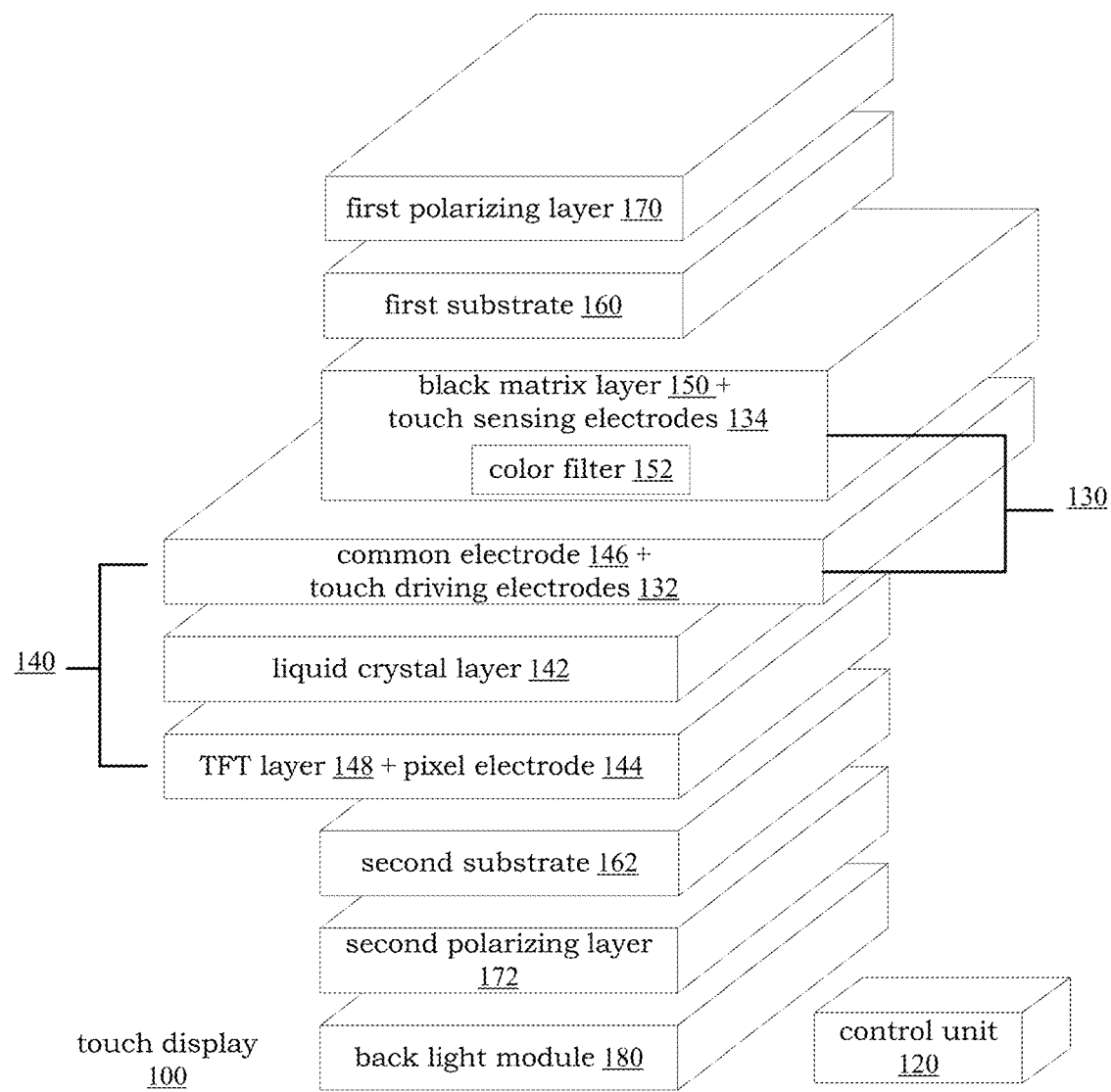
Figure 1E:
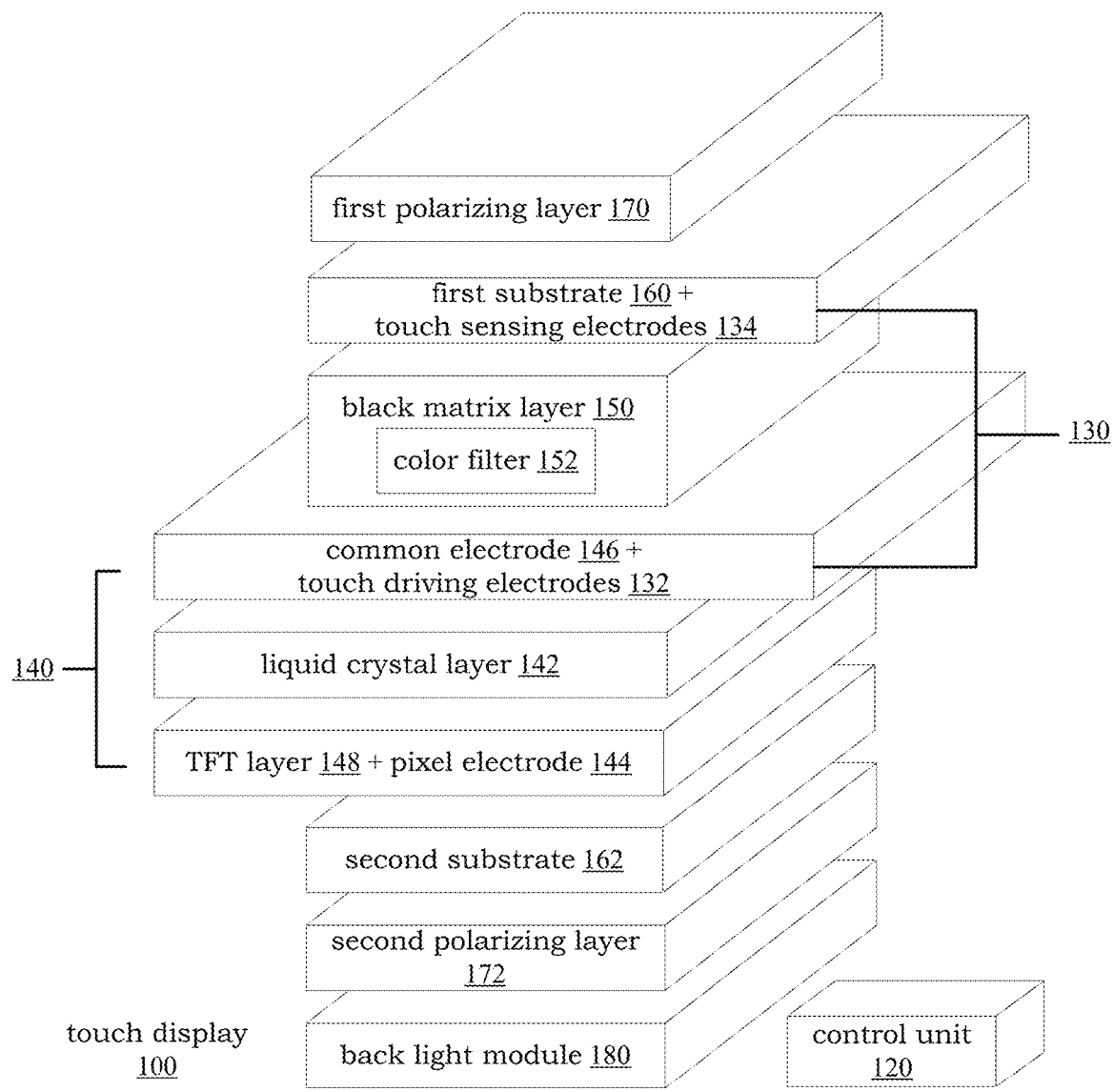
Figure 1F:
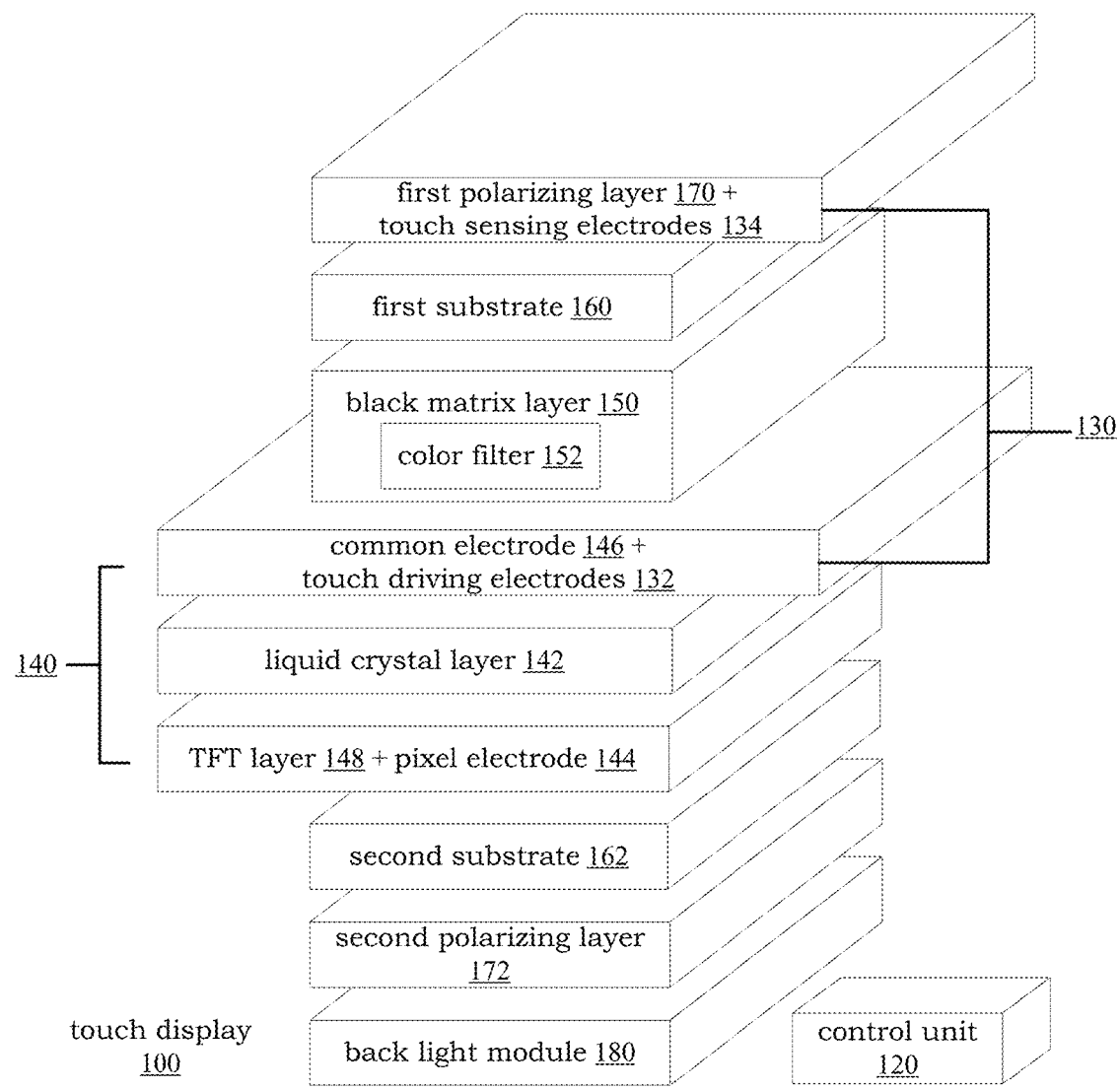

The plurality of touch sensing electrodes 134 could be integrated into each layer configured on the plurality of touch driving electrodes 132, or could be configured between any adjacent two of the layers configured on the plurality of touch driving electrodes 132. In one embodiment, the plurality of touch sensing electrodes 134 could be configured between the first substrate 160 and the first polarizing layer 170 as shown in FIG. 1A. In another one embodiment, the plurality of touch sensing electrodes 134 could be configured between the black matrix layer 150 and the first substrate 160 as shown in FIG. 1B. In further another one embodiment, the plurality of touch sensing electrodes 134 could be configured between the black matrix layer 150 and the plurality of touch driving electrodes 132 as shown in FIG. 1C. In further another one embodiment, the plurality of touch sensing electrodes 134 could be integrated into the black matrix layer 150 as shown in FIG. 1D. In further another one embodiment, the plurality of touch sensing electrodes 134 could be integrated into the first substrate 160 as shown in FIG. 1E. In further another one embodiment, the plurality of touch sensing electrodes 134 could be integrated into the first polarizing layer 170 as shown in FIG. 1F.

Furthermore, touch display 100 further comprises a second substrate 162, a second polarizing layer 172 and a back light module 180. The pixel electrode 144 is configured between the back light module 180 and the common electrode 146. The second substrate 162 and the second polarizing layer 172 are both configured between the pixel electrode 144 and the back light module 180.

In one embodiment, the first substrate 160 and the second substrate 162 could be formed by transparent materials, wherein the second substrate 162 could be a TFT glass The common electrode 146 comprises a plurality of sub electrodes, wherein the plurality of sub electrodes are arranged in parallel. The plurality of sub electrodes could be divided into a plurality of groups, and each group of sub electrodes are coupled to a DC potential. The plurality of touch driving electrodes also could be divided into a plurality of groups, and each group of touch driving electrodes could comprise one or more touch driving electrodes 132. Each group of touch driving electrodes are coupled to a selecting circuit 200, and the selecting circuit 200 switches each group of touch driving electrodes to be driven. One or more groups of touch driving electrodes could be integrated into each group of sub electrodes of the common electrode 146, or at least one group of touch driving electrodes could be integrated into two adjacent groups of sub electrodes.

Please refer to FIG. 2A, FIG. 2B, FIG. 2C and FIG. 2D, which depict schematic diagrams of the common electrode 146 and the plurality of touch driving electrodes 132 according to embodiments of the present invention. Multiple touch driving electrodes 132 of one or more groups of touch driving electrodes could be continuously or discretely integrated into each group of sub electrodes.

Figure 2A:
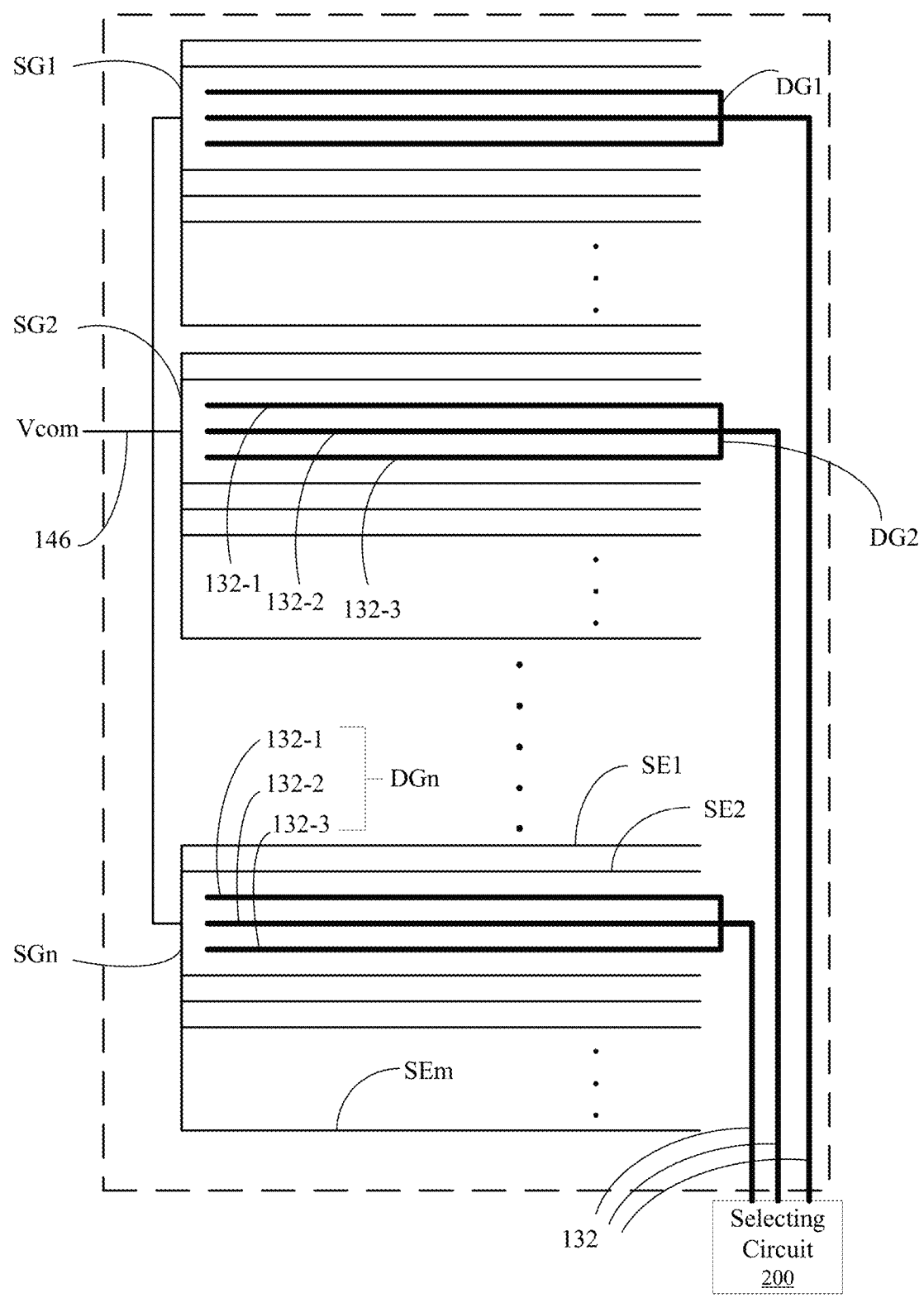
FIGS. 2A, 2B, 2C and 2D are schematic diagrams of a common electrode 146 and a plurality of touch driving electrodes 132 according to embodiments of the present invention.

Please refer to FIG. 2A, a plurality of groups of sub electrodes of the common electrode 146 comprise a first group of sub electrodes SG1, a second group of sub electrodes SG2, . . . , and a nth group of sub electrodes SGn. Each group of sub electrodes comprise a plurality of sub electrodes, wherein the plurality of sub electrodes comprise a first sub electrode SE1, a second sub electrode SE2, . . . , and a mth sub electrode SEm. A plurality of touch driving electrodes comprise a first group of touch driving electrodes DG1, a second group of touch driving electrodes DG2, . . . , and a nth group of touch driving electrodes DGn, and each group of touch driving electrodes comprise three touch driving electrodes 132-1, 132-2, 132-3. The first group of touch driving electrodes DG1 are integrated into the first group of sub electrodes SG1; the second group of touch driving electrodes DG2 are integrated into the second group of sub electrodes SG2; . . . ; and the nth group of touch driving electrodes DGn are integrated into the nth group of sub electrodes SGn. In each group of sub electrodes SG1, SG2 . . . SGn, three touch driving electrodes 132-1, 132-2, 132-3 are continuously configured.

Figure 2B:
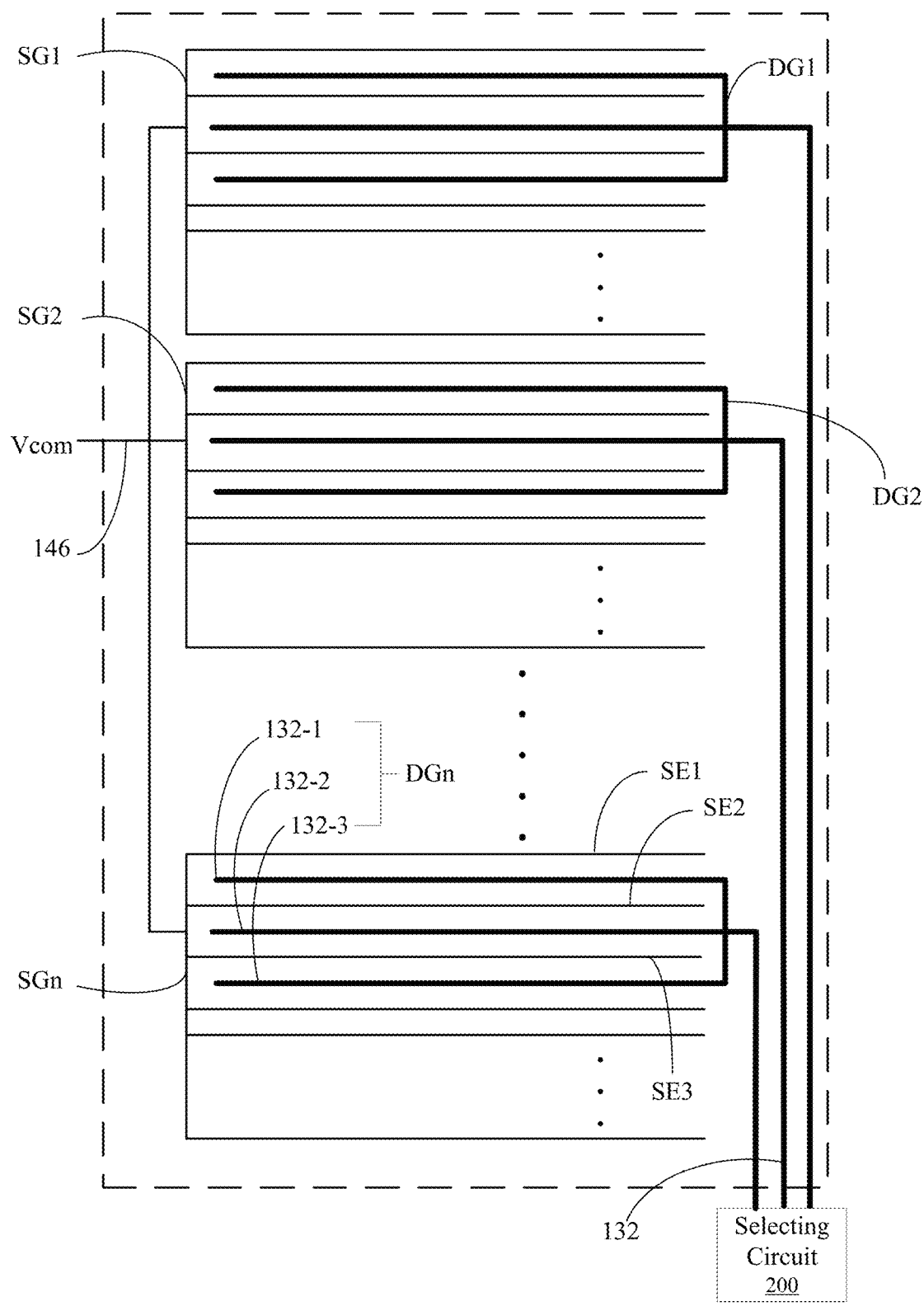

Please refer to FIG. 2B, each group of touch driving electrodes DG1, DG2, . . . , DGn are still integrated into each group of sub electrodes SG1, SG2 . . . SGn separately, but three touch driving electrodes are configured discretely. For example, in the nth group of touch driving electrodes DGn, a second sub electrode SE2 of the nth group of sub electrodes SGn is configured between the adjacent two touch driving electrodes 132-1, 132-2 of three touch driving electrodes, and a third sub electrode SE3 of the nth group of sub electrodes SGn is configured between another adjacent two touch driving electrodes 132-2, 132-3 of three touch driving electrodes.

Figure 2C:
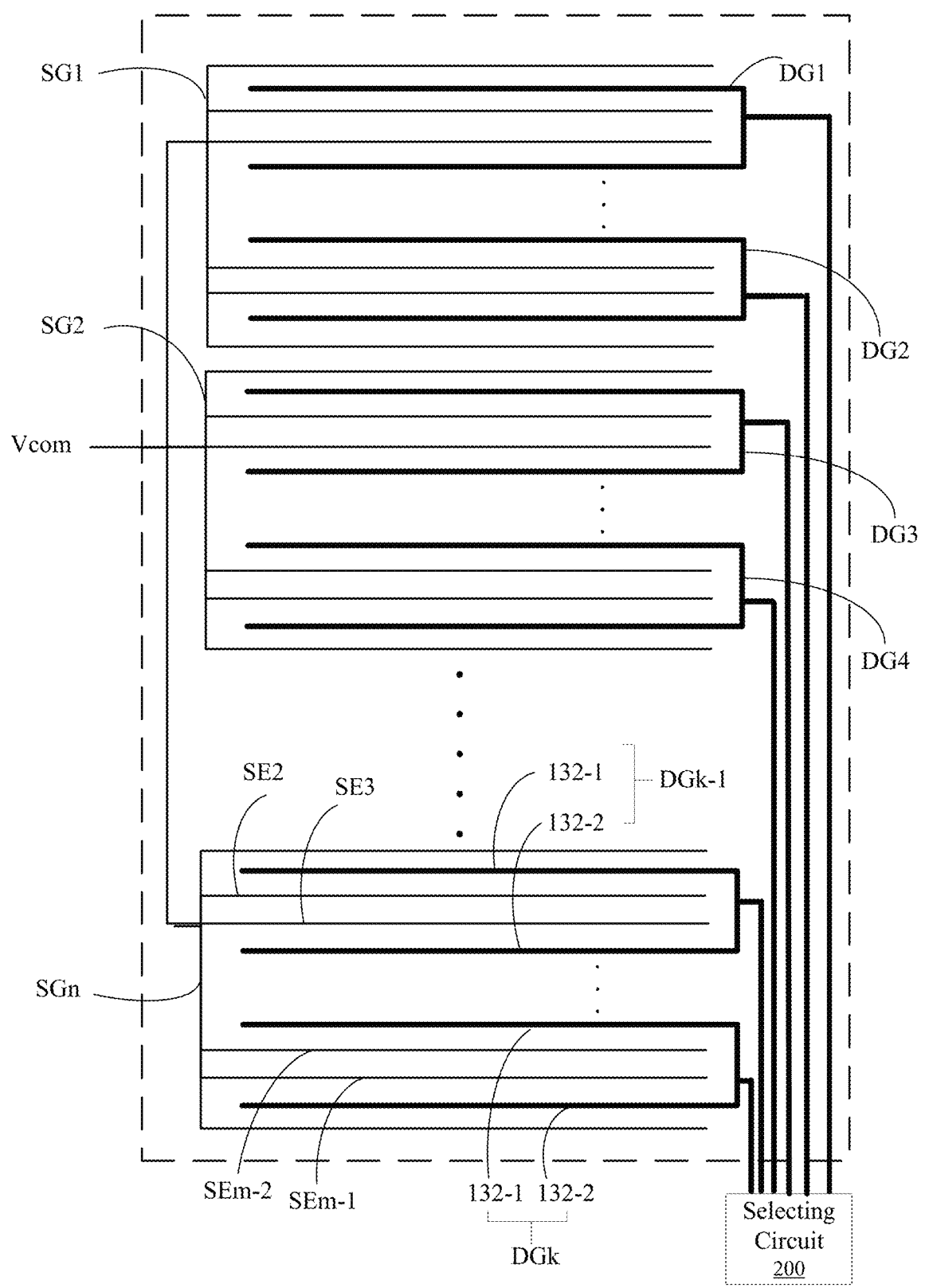

Please refer to FIG. 2C, two groups of touch driving electrodes are integrated into each group of sub electrodes SG1, SG2 . . . SGn, and the plurality of touch driving electrodes could be divided into k groups of touch driving electrodes DG1, DG2 . . . DGk, wherein k=2n. Each group of touch driving electrodes DG1, DG2 . . . DGk comprise two touch driving electrodes 132-1, 132-2. In each group of touch driving electrodes DG1, DG2 . . . DGk, two touch driving electrodes 132 are discretely configured. For example, in a k−1th group of touch driving electrodes DGk−1, a second sub electrode SE2 and a third sub electrode SE3 of a nth group of sub electrodes SGn are configured between the adjacent two touch driving electrodes 132-1, 132-2. In a kth group of touch driving electrodes DGk, a m−2th sub electrode SEm−2 and a m−1th sub electrode SEm−1 of a nth group of sub electrodes SGn are configured between the adjacent two touch driving electrodes 132-1, 132-2.

Figure 2D:
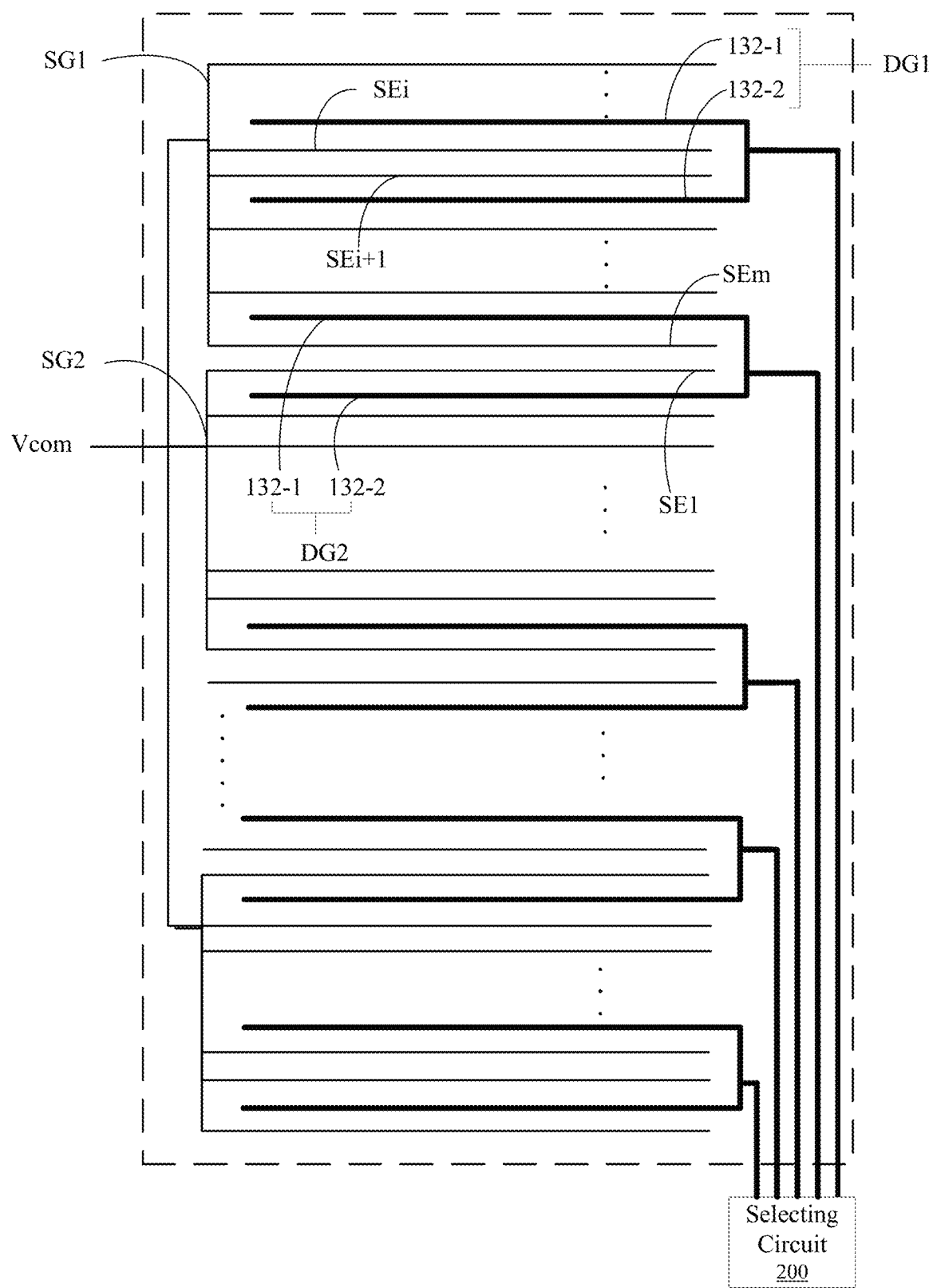

Please refer to FIG. 2D, the plurality of touch driving electrodes could be divided into j groups of touch driving electrodes DG1, DG2 . . . DGj. Two touch driving electrodes 132-1, 132-2 of each group of touch driving electrodes DG1, DG2 . . . DGj could be integrated into the same one group of sub electrodes, or could be integrated into the adjacent two groups of sub electrodes. For example, two touch driving electrodes 132-1, 132-2 of the first group of touch driving electrodes DG1 are integrated into the first group of sub electrodes SG1, and a ith sub electrode SEi and a i+1th sub electrode SEi+1 of the first group of sub electrodes SG1 are configured between two touch driving electrodes 132-1, 132-2 of the first group of touch driving electrodes DG1. Two touch driving electrodes 132-1, 132-2 of the second group of touch driving electrodes DG2 could be integrated into the first group of sub electrodes SG1 and the second group of sub electrodes SG2, wherein a mth sub electrode SEm of the first group of sub electrodes SG1 and a first sub electrode SE1 of the second group of sub electrodes SG2 are configured between two touch driving electrodes 132-1, 132-2 of the second group of touch driving electrodes DG2.

With respect to the common electrode 146, the area of all groups of sub electrodes SG1, SG2 . . . SGn, which are coupled with a DC potential, is larger than the area of the plurality of touch driving electrodes 132 so as to reduce EMI from the TFT layer 148 by the shielding region.

Figure 3:
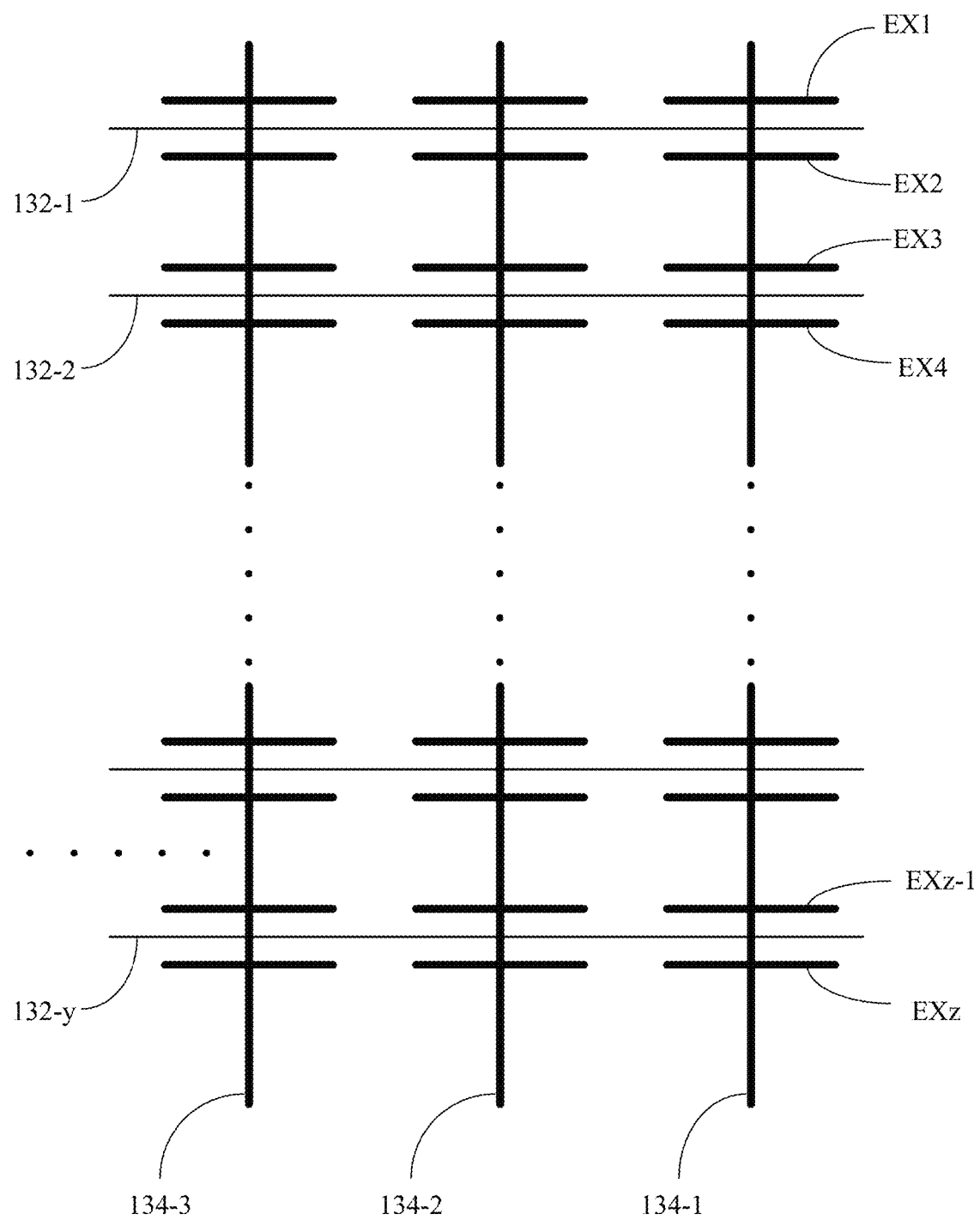
FIG. 3 is a partial perspective diagram of touch driving electrodes and touch sensing electrodes according to one embodiment of the present invention.

Please refer to FIG. 3, which depicts a partial perspective diagram of touch driving electrodes and touch sensing electrodes according to one embodiment of the present invention. A plurality of touch driving electrodes 132 and a plurality of touch sensing electrodes 134 cross each other. Each touch sensing electrode 134 comprises a plurality of extensions, and each extension parallels the plurality of touch driving electrodes 132 so as to enhance mutual capacitive coupling between the touch sensing electrode 134 and the plurality of touch driving electrodes 132. For example, a first touch sensing electrode 134-1 comprises a first extension EX1, a second extension EX2, a third extension EX3, a fourth extension EX4, . . . , a z−1th extension EXz−1, a zth extension EXz, wherein z=2y. The first extension EX1 and the second extension EX2 are adjacent and both parallel the first touch driving electrode 132-1 to enhance mutual capacitive coupling between the first touch sensing electrode 134-1 and the first touch driving electrode 132-1. Furthermore, the third extension EX3 and the fourth extension EX4 are adjacent and both parallel the second touch driving electrode 132-2 to enhance mutual capacitive coupling between the first touch sensing electrode 134-1 and the second touch driving electrode 132-2. Similarly, the z−1th extension EXz−1 and the zth extension EXz are adjacent and both parallel the yth touch driving electrode 132-y to enhance mutual capacitive coupling between the first touch sensing electrode 134-1 and the yth touch driving electrode 132-y.

The TFT layer 148 must update horizontal pixel lines one by one so as to update frames of the display. When at least one touch driving electrode, which is driven, overlaps or approaches the horizontal pixel line, which is been updating by the TFT layer 148, the driving signal from the at least one driven touch driving electrode will interfere with the updating horizontal pixel line. In general, touch device will drive the plurality of touch driving electrodes 132 when the display is not updating the horizontal pixel lines, so as to avoid that the driving signals interfere with the updating of the horizontal pixel lines. However, the present invention further discloses a method for driving a plurality of touch driving electrodes 132 of a touch display, which could update the horizontal pixel lines and drive the plurality of touch driving electrodes 132 simultaneously. At first, the driving direction of the plurality of touch driving electrodes 132 is set to be opposite to the updating direction of the TFT layer 148. When at least one touch driving electrode which be driven will influence the horizontal pixel line updated by the TFT layer 148, driving signals of the at least one touch driving electrode is suspended until the horizontal pixel line updated by the TFT layer 148 leaves the effect range of the at least one touch driving electrode.

Figure 4:
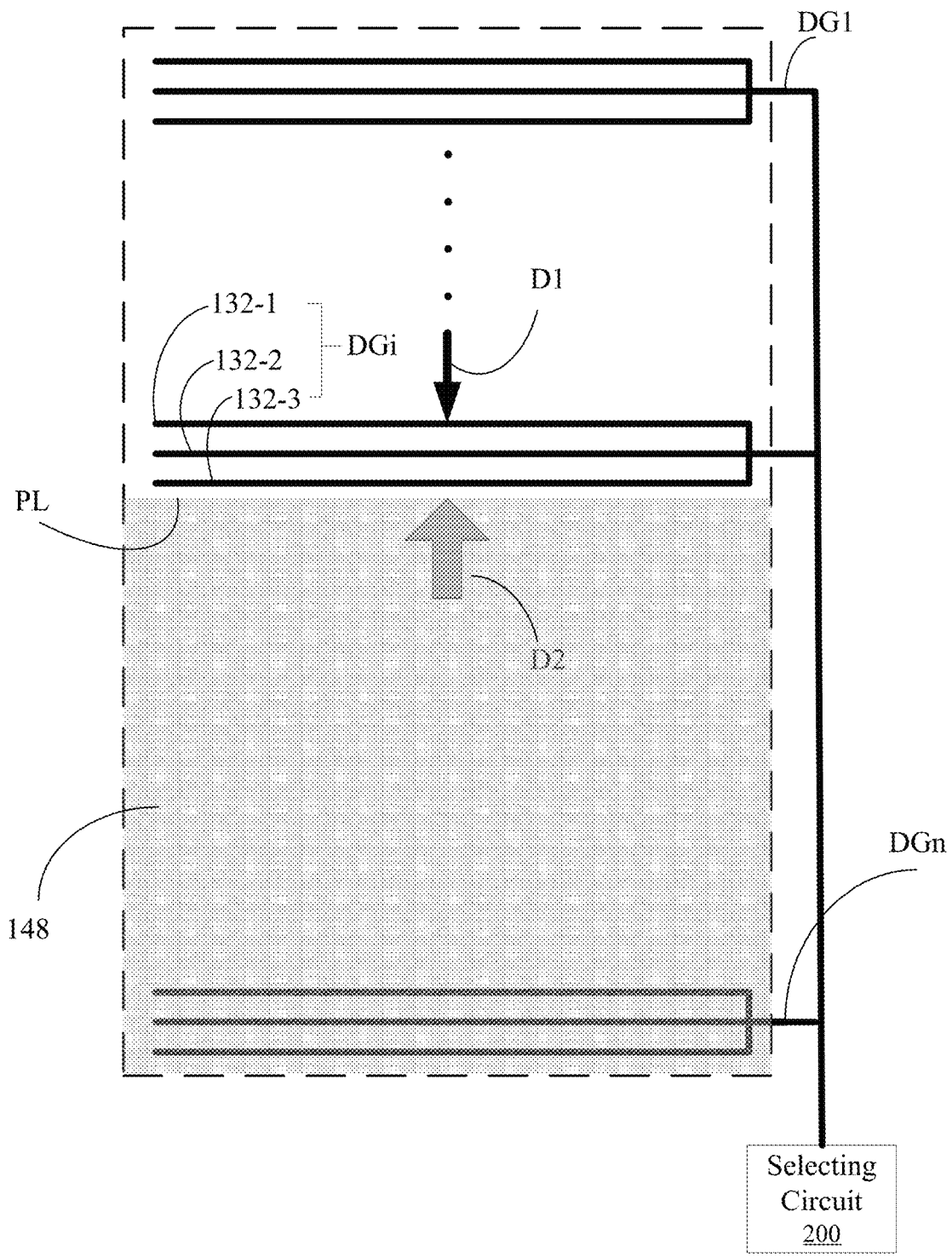
FIG. 4 is a partial perspective diagram of updating direction of a TFT layer and a driving direction of a plurality of touch driving electrodes according to one embodiment of the present invention.

Please refer to FIG. 4, which depicts a partial perspective diagram of updating direction of the TFT layer and the driving direction of the plurality of touch driving electrodes according to one embodiment of the present invention. The driving direction D1 of the plurality of touch driving electrodes and the updating direction D2 of the TFT layer 148 are opposite. When three touch driving electrodes 132-1, 132-2, 132-3 of the driven ith group of touch driving electrodes DGi overlap or approach the updating horizontal pixel line PL of the TFT layer 148, the selecting circuit 200 suspends driving signals of the originally driven ith group of touch driving electrode DGi, and re-drives the ith group of touch driving electrode DGi after the updating horizontal pixel line leaves the effect range of the ith group of touch driving electrode DGi. The plurality of touch driving electrodes 132 are configured horizontally to parallel the horizontal pixel lines of the TFT layer 148, and parallels the plurality of sub electrodes.

Figure 5:
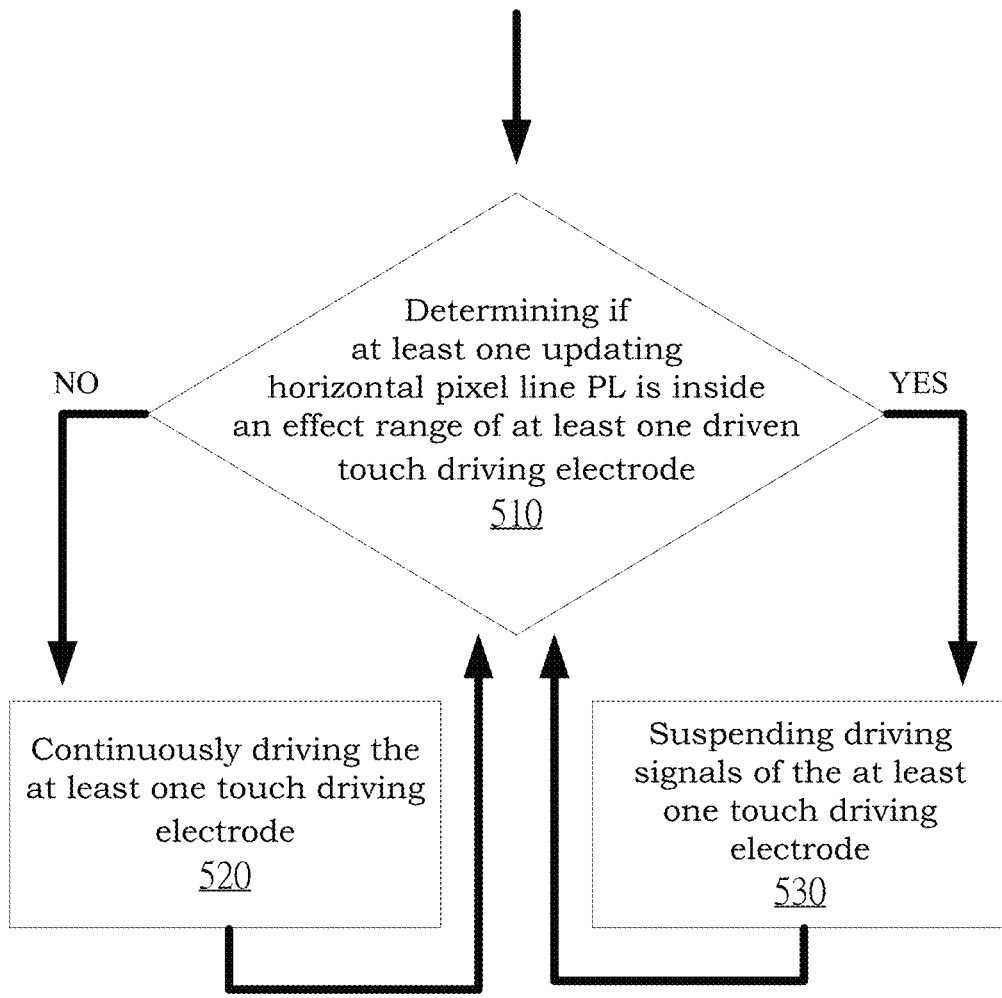
FIG. 5 is a flowchart of a method for driving touch driving electrodes according to one embodiment of the present invention.

Accordingly, the present invention further discloses a method for driving a plurality of touch driving electrodes of a touch display. Please refer to FIG. 5, which depicts a flowchart of the method for driving touch driving electrodes according to one embodiment of the present invention. At first, in step 500, while the display (or touch display) is updating one or more horizontal pixel lines, the touch display simultaneously provides driving signals to at least one touch driving electrode so as to detect mutual capacitive coupling. In other words, one or more horizontal pixel lines are updated, and at least one touch driving electrode is provided with driving signals simultaneously. Then, in step 510, if at least one updating horizontal pixel line PL is inside an effect range of at least one driven touch driving electrode is determined. Next, in step 520, while the at least one updating horizontal pixel line PL is outside the effect range, the at least one touch driving electrode is continuously driven, and step 510 is continued to be performed. Then, in step 530, while the at least one updating horizontal pixel line PL is inside the effect range, driving signals of the at least one touch driving electrode are suspended, and step 510 is continued to be performed. Later, while updating the at least one horizontal pixel line which is outside the effect range, step 520 is performed again to drive the at least one touch driving electrode.

Accordingly, the present invention discloses a touch device, as shown in FIG. 1A to FIG. 1F. The touch device comprises a plurality of touch driving electrodes 132, a plurality of touch sensing electrodes 134 and a control unit 120. The plurality of touch driving electrodes 132 are integrated into a common electrode 146 driving a liquid crystal layer 142, wherein the common electrode 146 except the plurality of touch driving electrodes 132 is coupled with a DC potential Vcom to form a shielding region. The shielding region is placed between a TFT layer 148 and the plurality of touch sensing electrodes 134 so as to reduce EMI caused by the updating TFT layer 148. The control unit 120 detects capacitive coupling between the plurality of touch driving electrodes 132 and the plurality of touch sensing electrodes 134 so as to execute operations of at least one external object.

The present further discloses a display, as shown in FIG. 1A to FIG. 1F. The display comprises a pixel electrode 144, a common electrode 146 and a liquid crystal layer 142. The common electrode 146 comprises the plurality of touch driving electrodes 132 stated above, and the common electrode 146 except the plurality of touch driving electrodes 132 is coupled with the DC potential Vcom to form the shielding region. The liquid crystal layer 142 is configured between the pixel electrode 144 and the common electrode 146, and is driven by the pixel electrode 144 and the common electrode 146.

The present further discloses a touch display, as shown in FIG. 1A to FIG. 1F. The touch display comprises a control unit 120 and the foregoing display. The control unit provides driving signals to the plurality of touch driving electrodes 132 and receives sensing signals from the plurality of touch sensing electrodes 134 so as to detect touch or proximity of at least one external object based on capacitive coupling between the plurality of touch driving electrodes 132 and the plurality of touch sensing electrodes 134. The display comprises the liquid crystal layer 142; and the pixel electrode 144 and the common electrode 146 which both drive the liquid crystal layer 142, wherein the common electrode 146 comprises the plurality of touch driving electrodes 132, and the common electrode 146 except the plurality of touch driving electrodes 132 is coupled with the DC potential Vcom to form the shielding region.

The present invention further discloses a common electrode 146, as shown in FIG. 1A to FIG. 1F. The common electrode 146 is integrated into the display, and the common electrode 146 and the pixel electrode 144 both drive the liquid crystal layer 142. The common electrode 146 comprises the plurality of touch driving electrodes 132, and the common electrode 146 except the plurality of touch driving electrodes 132 is coupled with the DC potential Vcom to form the shielding region. Furthermore, the plurality of touch driving electrodes 132 are provided with driving signals, and sensing signals are received from the plurality of the touch sensing electrodes 134. Thus, touch or proximity of at least one external object is detected based on the capacitive coupling between the plurality of touch driving electrodes 132 and the plurality of touch sensing electrodes 134.

Other details of the present invention have already been disclosed hereinabove, and will not be further illustrated.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A display, comprising:
   a pixel electrode;
   a common electrode, comprising a plurality of sub electrodes coupled with a DC potential to form a shielding region, wherein a plurality of touch driving electrodes of a touch device are integrated into the common electrode; and
   a liquid crystal layer, placed between the pixel electrode and the common electrode and driven by the pixel electrode and the common electrode, wherein the pixel electrode is integrated into a TFT (thin film transistor) layer, and the plurality of touch driving electrodes are configured horizontally and parallels a plurality of horizontal pixel lines updated by the TFT layer, wherein the driving direction of the plurality of touch driving electrodes is opposite to the updating direction of the TFT layer, wherein when at least one touch driving electrode which be driven will influence the horizontal pixel line updated by the TFT layer, driving signals of the at least one touch driving electrode is suspended until the horizontal pixel line updated by the TFT layer leaves the effect range of the at least one touch driving electrode.

2. The display of claim 1, wherein the area of the shielding region is larger than the area of the plurality of touch driving electrodes.

3. The display of claim 1, further comprising a TFT (thin film transistor) layer, wherein the shielding region is placed between the TFT layer and a plurality of touch sensing electrodes so as to reduce EMI (ElectroMagnetic Interference) caused by the updating TFT layer, wherein the plurality of touch driving electrodes are provided with driving signals, and sensing signals are received from the plurality of the touch sensing electrodes such that touch or proximity of at least one external object is detected based on the capacitive coupling between the plurality of touch driving electrodes and the plurality of touch sensing electrodes.

4. The display of claim 1, wherein the plurality of sub electrodes which are arranged in parallel, wherein the plurality of touch driving electrodes are continuously or discretely integrated into the plurality of sub electrodes, and parallel the plurality of sub electrodes.

5. The display of claim 1, further comprising a plurality of touch sensing electrodes of the touch device, wherein each touch sensing electrode comprises a plurality of extensions, and each extension parallels the plurality of touch driving electrodes so as to enhance capacitive coupling between the touch sensing electrode and the plurality of touch driving electrodes.

6. The display of claim 1, further comprising a first polarizing layer, a black matrix layer and a first substrate on the plurality of touch driving electrodes, wherein the plurality of touch sensing electrodes are placed between two of the layers on the plurality of touch driving electrodes, or are integrated into the layers on the plurality of touch driving electrodes.

7. A touch device, comprising:
a plurality of touch driving electrodes, integrated into a common electrode of a liquid crystal layer, wherein the common electrode comprises a plurality of sub electrodes coupled with a DC potential to form a shielding region;
a plurality of touch sensing electrodes; and
a control unit, detecting capacitive coupling between the plurality of touch driving electrodes and the plurality of touch sensing electrodes so as to execute operations of at least one external object, wherein the plurality of touch driving electrodes are configured horizontally and parallels a plurality of horizontal pixel lines updated by a TFT (thin film transistor) layer, wherein the driving direction of the plurality of touch driving electrodes is opposite to the updating direction of the TFT layer, wherein when at least one touch driving electrode which be driven will influence the horizontal pixel line updated by the TFT layer, driving signals of the at least one touch driving electrode is suspended until the horizontal pixel line updated by the TFT layer leaves the effect range of the at least one touch driving electrode, wherein the TFT layer comprises a pixel electrode, and the pixel electrode and the common electrode drive the liquid crystal layer.

8. The touch device of claim 7, wherein the area of the shielding region is larger than the area of the plurality of touch driving electrodes.

9. The touch device of claim 7, wherein each touch sensing electrode comprises a plurality of extensions, and each extension parallels the plurality of touch driving electrodes so as to enhance capacitive coupling between the touch sensing electrode and the plurality of touch driving electrodes.

10. The touch device of claim 7, wherein the shielding region is placed between a TFT (thin film transistor) layer and the plurality of touch sensing electrodes so as to reduce EMI (ElectroMagnetic Interference) caused by the updating TFT layer.

11. The touch device of claim 7, wherein the plurality of sub electrodes which are arranged in parallel, wherein the plurality of touch driving electrodes are continuously or discretely integrated into the plurality of sub electrodes, and parallel the plurality of sub electrodes.

12. A touch display, comprising:
a control unit, providing driving signals to a plurality of touch driving electrodes and receiving sensing signals from a plurality of touch sensing electrodes so as to detect touch or proximity of at least one external object based on capacitive coupling between the plurality of touch driving electrodes and the plurality of touch sensing electrodes; and
a display, comprising a liquid crystal layer; and a pixel electrode and a common electrode which both drive the liquid crystal layer, wherein the common electrode comprises a plurality of sub electrodes coupled with a DC potential to form a shielding region, wherein the plurality of touch driving electrodes are integrated into the common electrode, wherein the pixel electrode is integrated into a TFT (thin film transistor) layer, and the plurality of touch driving electrodes are configured horizontally and parallels a plurality of horizontal pixel lines updated by the TFT layer, wherein the driving direction of the plurality of touch driving electrodes is opposite to the updating direction of the TFT layer, wherein when at least one touch driving electrode which be driven will influence the horizontal pixel line updated by the TFT layer, driving signals of the at least one touch driving electrode is suspended until the horizontal pixel line updated by the TFT layer leaves the effect range of the at least one touch driving electrode.

13. The touch display of claim 12, wherein the area of the shielding region is larger than the area of the plurality of touch driving electrodes.

14. The touch display of claim 12, wherein the display further comprises a TFT (thin film transistor) layer, and the shielding region is placed between the TFT layer and a plurality of touch sensing electrodes so as to reduce EMI (ElectroMagnetic Interference) caused by the updating TFT layer.

15. The touch display of claim 12, wherein the plurality of sub electrodes which are arranged in parallel, wherein the plurality of touch driving electrodes are continuously or discretely integrated into the plurality of sub electrodes, and parallel the plurality of sub electrodes.

16. The touch display of claim 12, wherein each touch sensing electrode comprises a plurality of extensions, and each extension parallels the plurality of touch driving electrodes so as to enhance capacitive coupling between the touch sensing electrode and the plurality of touch driving electrodes.

17. The touch display of claim 12, wherein the display further comprises a first polarizing layer, a black matrix layer and a first substrate on the plurality of touch driving electrodes, wherein the plurality of touch sensing electrodes are placed between two of the layers on the plurality of touch driving electrodes, or are integrated into the layers on the plurality of touch driving electrodes.

18. A common electrode, integrated into a display, and the common electrode and a pixel electrode both drive a liquid crystal layer, wherein the common electrode comprises:
a plurality of sub electrodes, coupled with a DC potential to form a shielding region, wherein a plurality of touch driving electrodes of a touch device are integrated into the common electrode;
wherein the plurality of touch driving electrodes are provided with driving signals, and sensing signals are received from a plurality of touch sensing electrodes such that touch or proximity of at least one external object is detected based on the capacitive coupling between the plurality of touch driving electrodes and the plurality of touch sensing electrodes;
wherein the pixel electrode is integrated into a TFT (thin film transistor) layer, and the plurality of touch driving electrodes are configured horizontally and parallels a plurality of horizontal pixel lines updated by the TFT layer, wherein the driving direction of the plurality of touch driving electrodes is opposite to the updating direction of the TFT layer, wherein when at least one touch driving electrode which be driven will influence the horizontal pixel line updated by the TFT layer, driving signals of the at least one touch driving electrode is suspended until the horizontal pixel line updated by the TFT layer leaves the effect range of the at least one touch driving electrode.

19. A method for driving a plurality of touch driving electrodes of a touch display, comprising:
providing driving signals to at least one touch driving electrode to detect mutual capacitances to determine whether or not there is at least one touch position while updating one or more horizontal pixel lines of the display based on the steps:

determining whether or not at least one horizontal pixel line, which is updating, is inside an effect range of at least one touch driving electrode, which is driven;

continuously driving the at least one touch driving electrode while the at least one horizontal pixel line, which is updating, is outside the effect range;

suspending driving signals of the at least one touch driving electrode while the at least one horizontal pixel line, which is updating, is inside the effect range; and driving the at least one touch driving electrode while updating the at least one horizontal pixel line which is outside the effect range.

20. The method of claim 19, wherein the driving direction of the plurality of touch driving electrodes is opposite to the updating direction of the horizontal pixel lines of the display.

* * * * *